UNITED STATES PATENT OFFICE.

FRANZ SCHOLL, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

BLACK DISAZO DYESTUFF AND PROCESS OF MAKING SAME.

1,028,140. Specification of Letters Patent. Patented June 4, 1912.

No Drawing. Application filed September 20, 1911. Serial No. 650,322.

*To all whom it may concern:*

Be it known that I, FRANZ SCHOLL, Ph. D., chemist, a citizen of the Empire of Germany, residing at Höchst-on-the-Main, Germany, have invented certain new and useful Improvements in Black Disazo Dyestuffs and Processes of Making Same, of which the following is a specification.

I have found that valuable black basic secondary disazo dyestuffs can be produced by diazotizing trimethylammoniumphenyl-azo-m-toluidin and combining it with heteronuclear α-α-diaminonaphthalenes. These dyestuffs are black powders, soluble in water and alcohol, insoluble in ether, benzene and petroleum ether and are of great value for dyeing artificial silk.

The following example illustrates my invention: 34 kg. of hydrochlorid of trimethylammoniumphenyl-azo-m-toluidin are dissolved in about 1500 liters of water and diazotized with 24 kg. of hydrochloric acid (19° Bé.) and 6.9 kg. of sodium nitrite. This diazo solution is run into a cooled solution of 16 kg. of 1.8-diaminonaphthalene in 24 kg. of hydrochloric acid (19° Bé.) and about 600 liters of water. After having stirred the mixture for a good time it is heated to about 50° C. and salted out by adding a solution of common salt. When dry, the dyestuff forms a black powder with a cupreous luster, soluble in water with a violet color, yielding on addition of a mineral acid a dark-blue precipitate and on addition of ammonia a reddish-violet solution, soluble in concentrated sulfuric acid with a greenish-blue color and in alcohol with a bluish-violet color, insoluble in ether, benzene and ligroin, and dyes artificial silk a beautiful bluish-violet black tint.

In the place of the 1.8 diaminonaphthalene may be used the 1.5 diaminonaphthalene.

Having now described my invention, what I claim is:

1. As new products, basic disazo dyestuffs of the constitution:

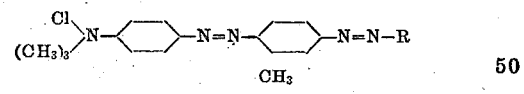

wherein "R" stands for a heteronuclear α-α-diaminonaphthalene; being black powders, soluble in water and alcohol, insoluble in ether, benzene and petroleum-ether, dyeing artificial silk black tints.

2. As a new product, the basic disazo dyestuff of the constitution:

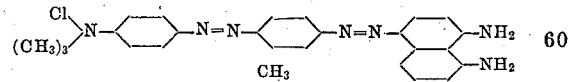

being a black powder with a cupreous luster, soluble in water with a violet color, yielding on addition of a mineral acid a dark-blue precipitate and on addition of ammonia a reddish-violet solution, soluble in concentrated sulfuric acid with a greenish-blue color and in alcohol with a bluish-violet color, insoluble in ether, benzene and ligroin, dyeing artificial silk a bluish-violet black tint.

3. The process of manufacturing basic disazo dyestuffs which consists in diazotizing trimethylammoniumphenyl-azo-m-toluidin and causing it to act upon heteronuclear α-α-diaminonaphthalenes.

In testimony whereof, I affix my signature in presence of two witnesses.

FRANZ SCHOLL.

Witnesses:
JEAN GRUND,
CARL GRUND.

---

Copies of this patent may be obtained for five cents each, by addressing the "Commissioner of Patents, Washington, D. C."